March 15, 1932. E. T. JANSSON 1,849,672
MILKING MACHINE
Filed Oct. 9, 1929
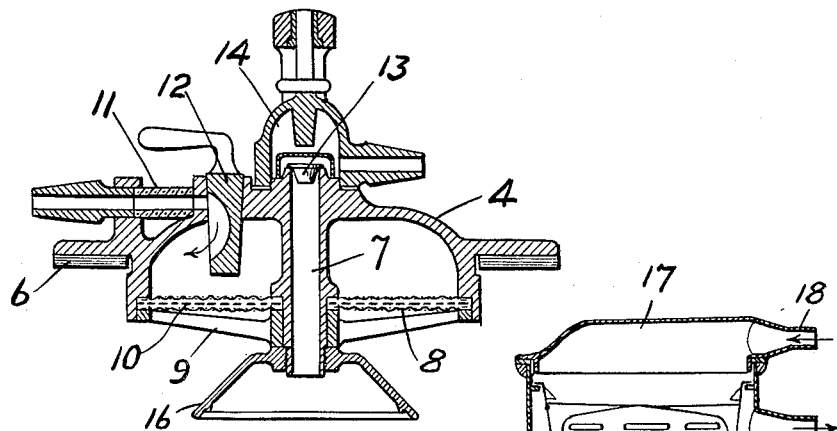
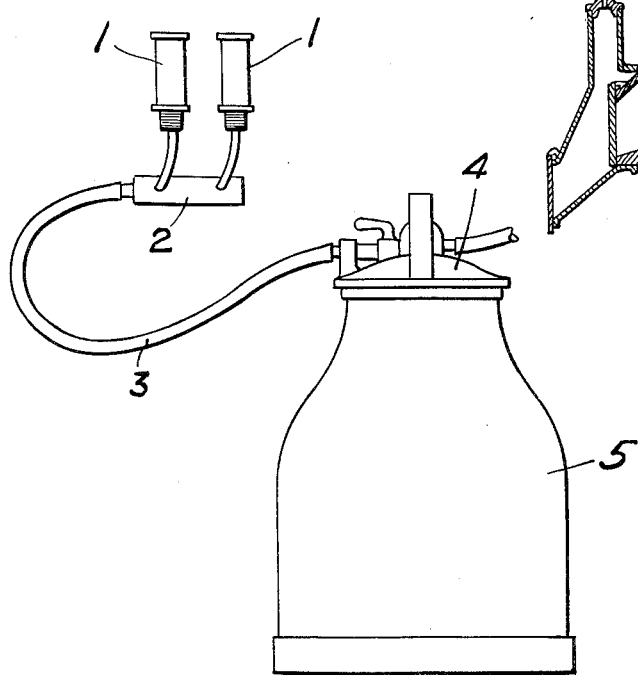
INVENTOR
Ernst Tage Jansson
BY
ATTORNEYS.
WITNESS:

Patented Mar. 15, 1932

1,849,672

UNITED STATES PATENT OFFICE

ERNST TAGE JANSSON, OF STOCKHOLM, SWEDEN, ASSIGNOR TO THE DE LAVAL SEPARATOR COMPANY, OF NEW YORK, N. Y., A CORPORATION OF NEW JERSEY

MILKING MACHINE

Application filed October 9, 1929, Serial No. 398,373, and in Sweden October 12, 1928.

My invention relates to an improvement in milking machines and more particularly relates to the provision of means whereby contamination of the milk from the udders and teats will be avoided.

Heretofore it has been recognized that while in machine milking contamination of the milk is substantially avoided, the milk may be contaminated from the udders and teats of the cow even though they may be carefully washed prior to the application of the milking organs or teat cups. Hence, in view of such possible contamination, it is generally customary, when machine milking is used, to strain the milk when it is transferred from the collecting vessel of the milking machine.

Now, it is the object of my invention to provide means in conjunction with a milking machine whereby the milk will be freed from any contamination before reaching the collecting vessel.

My invention will be understood from the following description in connection with the accompanying drawings, in which—

Fig. 1 is a view showing a collecting vessel and a pair of teat cups connected therewith.

Fig. 2 is a sectional view of the cover of the collecting vessel shown in Fig. 1.

Fig. 3 is a sectional view of a releaser.

In the drawings, 1 indicates the usual teat cups connected, through a pulsator of any usual construction, indicated at 2, and a hose 3, with the cover 4, of a milk collecting vessel 5, which is of usual construction and provided with a valve controlled conduit 7 extending downwardly into the vessel and adapted to be connected with a source of vacuum.

The cover 4 is provided with a packing 6 in order to insure a tight connection with the vessel 5.

Within the cover 4 and between the inlet for milk and the end of conduit 7 is positioned a filter, secured to the cover and to the conduit 7 as by a spider 9 held in place by a nut 16 engaging the conduit 7 and developed into a disc which acts to prevent milk from being sucked into conduit 7. The filter may be of any suitable material, but will desirably be formed by a layer or several thin layers of wadding 10 placed between straining layers 8 which serve to retain the wadding. Desirably the filter may be composed of several separated parallel layers of filtering material.

The cover 4 is provided with the usual attachments as an inspection glass 11, a milk cock 12, which is formed to divert the stream of milk from striking the filter, and a valve 13 positioned in a housing 14 for control of the vacuum through conduit 7.

As will now be understood, milk from the teat cups will pass through hose 3, inspection glass 11 and cock 12 and will enter the cover 4 on the upper side of the filter, through which it will pass into the collecting vessel. The passage of the milk through the filter is facilitated by the fact that a lower pressure prevails on the lower surface of the filter than on its upper surface and the difference in pressure will increase in proportion as the resistance in the filter increases on account of deposits. The filter will receive any contamination from the milk.

Referring more particularly to Fig. 3 in which is illustrated the adaptation of my invention to a releaser system, the releaser 17 is provided with a nipple 18 for connection to a milk line and a nipple 19 for connection with a source of vacuum. Within the releaser and positioned between the milk line and the body of the releaser with which nipple 18 communicates is positioned a filter 20. In the operation of the embodiment of my invention shown in Fig. 3, the milk passing from the milk line into the body of the releaser, under the influence of vacuum, will pass through the filter 20 under conditions similar to those described in connection with Figs. 1 and 2.

Having now fully described my invention, what I claim and desire to protect by Letters Patent is:

1. In a milking machine, the combination with a collecting vessel provided with a milk inlet, means forming a milk receiving chamber in the upper part of the collecting vessel, said means including a filter forming the lower wall of the chamber, and a conduit adapted for connection with a source of vacuum and communicating with the space in the collecting vessel below said filter, said chamber communicating with the milk inlet and closed against admission of air.

2. In a milking machine, the combination with a collecting vessel comprising a cover, a filter forming with the cover, a milk receiving chamber, an air conduit adapted for connection with source of vacuum and extending downward through said chamber and filter and opening into the collecting vessel below said filter, a milk inlet conduit communicating with said milk receiving chamber, and a turnable cock extending into said chamber and adapted, in closed position, to shut off inflow of milk through said passage, and provided with a milk passage adapted when the cock is in open position, to connect said milk inlet with the interior of said chamber and so divert the steam of incoming milk that it will not directly strike the filter.

3. In a milking machine, the combination with a collecting vessel comprising a removable cover, an air conduit adapted for connection with a source of vacuum and extending downward from said cover, a disc filter surrounding the air conduit above its lower end, a spider by means of which the filter is secured to the cover and air conduit, a nut on the lower end of the air conduit and engaging the spider, and a disc carried by the nut.

4. In a milking machine, the combination with a collecting vessel provided with a milk inlet, means forming a milk receiving chamber in the upper part of the collecting vessel, said means including a filter forming the lower wall of the vessel, a conduit adapted for connection with a source of vacuum and communicating with the space in the collecting vessel below said filter, said chamber communicating with the milk inlet and closed against admission of air, and means in said space below the filter to prevent milk that has passed through the filter from being sucked into the air conduit.

In testimony of which invention, I have hereunto set my hand, at Stockholm, Sweden, on this 24th day of September, 1929.

ERNST TAGE JANSSON.